United States Patent [19]

Burke et al.

[11] Patent Number: 4,528,101
[45] Date of Patent: Jul. 9, 1985

[54] METHOD OF SEPARATING ACID FROM SALT BY ADSORPTION WITH RECYCLING

[75] Inventors: Dennis J. Burke; Robert D. Moore, both of Rockford, Ill.

[73] Assignee: Illinois Water Treatment Company, Rockford, Ill.

[21] Appl. No.: 530,975

[22] Filed: Sep. 9, 1983

[51] Int. Cl.³ .............................................. B01D 15/08
[52] U.S. Cl. .................................. 210/656; 210/677; 423/488
[58] Field of Search ............... 210/635, 656, 677, 683, 210/672; 423/488, 499

[56] References Cited

U.S. PATENT DOCUMENTS 3,531,401  9/1970  Crits ..................................... 210/677

OTHER PUBLICATIONS

Reprint from I&EC Process Design and Development entitled "Acid Retardation, a Simple Physical Method for Separation of Strong Acids from Their Salts", by Melvin J. Hatch and John A. Dillon, published Oct. 1963.

Primary Examiner—Ivars Cintins
Attorney, Agent, or Firm—Neil M. Rose; Clifford A. Dean

[57] ABSTRACT

A process for the separation of a mineral acid from a common ion salt comprises a step of flowing a quantity of the mineral acid and salt in aqueous solution onto a strong base common ion form anion exchange resin bed whereon the mineral acid is retarded with respect to the salt. The salt is removed from the anion exchange resin. An interface cut of the mineral acid and the salt is recirculated from a bottom portion to a top portion of the anion exchange resin for further separation. A quantity of water is flowed through the anion exchange resin bed to elute the mineral acid therefrom. A portion of the elutant fluid is recycled to the top of the anion exchange resin bed.

10 Claims, 1 Drawing Figure

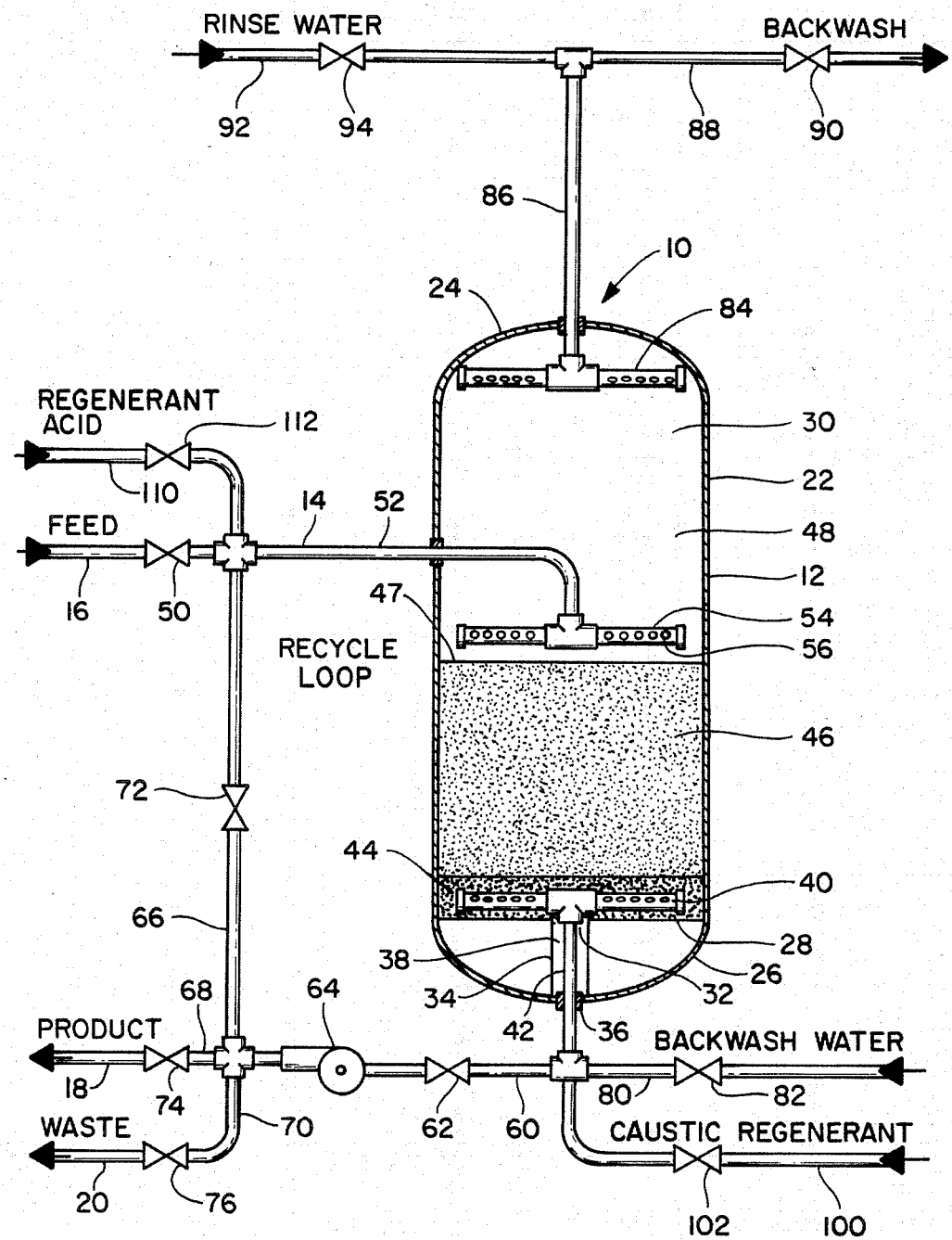

METHOD OF SEPARATING ACID FROM SALT BY ADSORPTION WITH RECYCLING

BACKGROUND OF THE INVENTION

Oftentimes in the process of regenerating ion exchange resins, good practice dictates that, in order to obtain complete regeneration, it is necessary to supply the resin with at least double the amount of regenerant chemical normally required by stoichiometric considerations. As a result, the excess regenerant chemical, mixed with salts which are released by the ion exchange resin during the course of regeneration comprise a waste product which has little or no economic value and which is in fact detrimental due to the fact that disposal problems are commonly encountered.

A typical regenerant used to regenerate ion exchange resins is hydrochloric acid. In many cases, after the hydrochloric acid, at a concentration of about 7%, is flowed over the ion exchange resin to be regenerated and regeneration is completed, a relatively large volume of hydrochloric acid in aqueous solution along with contaminating chloride salts, such as sodium chloride, must be disposed of. The spent or contaminated acid can no longer be used as a regenerant and thus is of little or no economic value. In addition, the spent acid comprises a disposal problem since further treatment of the acid or salts must take place before disposal.

Methods known as acid retardation have been developed whereby an acid-salt mixture is flowed in contact with an anion exchange resin to effect a separation of the acid and salt. However, the prior art methods have not assumed commercial importance due to the fact that only the incomplete separation of the acid and accompanying salt can be obtained. Typical of the prior art acid retardation is an article entitled, "Acid Retardation, A Simple Physical Method for Separation of Strong Acids From Their Salts," reprinted from I and EC, Process Development and Design, by Melvin J. Hatch and John A. Dilland, dated October, 1963. Therein a method of separating sodium chloride and hydrochloric acid is disclosed employing Dow Chemical Company Retardation, a strong base anion exchange resin. The prior art discloses that the resin preferentially retards the travel of an acid fraction down a column with respect to a more rapidly moving salt fraction, thereby enabling a separation of the acid and the salt to be effected.

It is clear, however, that the prior art method of acid separation from metal salts needs to be improved upon to make it economically feasible for use. Accordingly, what is needed is a new method for separating acids from their salts in aqueous solution employing a strong base anion exchange resin in the common anion form.

SUMMARY OF THE INVENTION

A method of separating an acid from metallic salts using a type 1 strong base anion exchange resin is disclosed herein. In particular, a method is disclosed for separating hydrochloric acid from sodium chloride in order to recover the hydrochloric acid to reuse it as a regenerant for other cation exchange or adsorption processes. A process comprising a plurality of feed, rinse, drain and recycle steps is disclosed herein.

A first step of the process comprises adding a feed mixture to an anion exchange resin. The feed mixture comprises hydrochloric acid and sodium chloride in aqueous solution. Simultaneously, water in the resin bed is drawn off and pumped to a waste stream as the first feed volume is added. Once the first or feed step is completed a portion of the liquid in the separation vessel is withdrawn and recycled through a recycling loop and back up to a distributor head where it is reinjected on top of the anion exchange resin. Next, the recycling loop is shut off and a measured amount of the deionized or condensate rinse water is flowed into the separation vessel on top of the resin. Simultaneously, a waste stream is drawn off through the bottom vessel. The waste stream comprises primarily a relatively high concentration of sodium chloride. The final step of the process involves reactivating the recycle loop to pump another fraction of the liquid in the separation vessel back around to the top of the anion exchange resin. The entire process is then repeated with more feed being flowed into the separation vessel from a suitable source while removing a product stream having a relatively high concentration of hydrochloric acid and a relatively low concentration of metallic salts.

The recovered hydrochloric acid from the product stream may then either be mixed with pure hydrochloric acid to produce a reclaimed hydrochloric acid which may be used for regeneration of other ion exchange resins or may be used as a first portion of a two step acid regenerant.

A principal object of the present invention is to provide a process for separating an acid from its common ion metallic salt wherein the efficiency of the separation is enhanced through the use of an internal recycling loop.

Another object of the invention is to provide a process wherein a substantially purified acid fraction can be obtained from a mixture of acid and its common ion salt in an economic manner.

Other advantages of the present invention will become obvious to one skilled in the art upon a perusal of the specifications and claims in light of the accompanying drawing.

BRIEF DESCRIPTION OF THE DRAWING

The only drawing FIGURE shows, in semi-schematic form, an adsorption system having an internal recycle loop for separating an acid from its common ion salt.

DESCRIPTION OF THE PREFERRED EMBODIMENT

Referring now to the only FIGURE of the drawing, an apparatus 10, for the separation of acid from a metal salt, is generally shown therein. The separation apparatus 10 generally includes a separation vessel 12 having a recycle loop 14 connected in communication therewith. The separation vessel 12 is adapted to receive a spent hydrochloric acid solution comprising hydrochloric acid at a concentration of about 3%–4% and sodium chloride at a concentration of 4000 to 25,000 parts per million in aqueous solution through a feed pipe 16 in order to effect separation of the hydrochloric acid from the sodium chloride. A relatively concentrated hydrochloric acid stream is provided by the apparatus 10 at a product pipe 18; a relatively concentrated sodium chloride solution is provided at a waste pipe 20. The feed pipe 16, the product pipe 18 and the waste pipe 20 all communicate with the separation vessel 12, as is more specifically disclosed hereinafter.

The separation vessel 12 consists of a substantially cylindrical metal tank having a cylindrical side wall 22, a curved top wall 24 and a curved outside bottom wall 26. A substantially flat false bottom 28 is seated in an interior 30 of the separation vessel 12 immediately above the outside bottom wall 26. The false bottom 28 has a central aperture 32 formed therein which communicates with a sleeve 34. The sleeve 34 has an internal bore 38 in order to allow a conventional distributor 40 having a distributor header 42 to communicate with piping outside of the separation vessel 12. The distributor 40 is located immediately adjacent the false bottom 28. The flat false bottom 28 is needed in order to insure that the concentration gradient of acid and/or salt in the liquid is horizontally uniform.

In order to effect a separation of the acid and salt fractions, a type 1 strong base anion exchange resin in the chloride ion form is loaded into the interior 30 of the separation vessel 12 so that the distributor 40 is substantially surrounded by a first coarse resin layer 44. In the present embodiment resin layer 44 comprises approximately 50 cubic feet of coarse mesh resin having a mesh size between 12 mesh and 40 mesh. A fine mesh type 1 anion exchange resin in chloride ion form lies in a layer 46 on top of the coarse resin layer 44. The resin of resin layer 46 has a mesh size between 40 mesh and 100 mesh and in the present embodiment occupies a volume of about 550 cubic feet within the separation vessel 12. The coarse mesh resin layer 44 is employed to prevent resin from flowing into the distributor 40 as fluid is flowing out of the separation vessel 12. The coarse and fine resin layers 44 and 46 comprise an anion exchange resin bed 47. As is customary in using anion exchange resin, an empty space 48 has been provided to give 100% freeboard above the anion exchange resin bed 47 so that when the bed 47 is backwashed the anion resin will have sufficient space to expand.

In order to deliver the feed stream consisting of hydrochloric acid and sodium chloride in aqueous solution to the resin bed 47 for purposes of separation, the feed pipe 16 communicates with the feed valve 50 which in turn communicates with a feed header 52. The feed header 52 extends through the side wall 22 of the separation vessel 12 and communicates with a feed distributor 54 having a plurality of horizontally located apertures 56 formed therein. The feed distributor 54 like the drain distributor 40 is a conventional distributor of the type used in ion exchange equipment.

In order to draw off product, waste or recycle streams, the drain distributor 40 is provided to collect fluid and allow it to flow through the drain header 42 to a drain pipe 60 which communicates with a drain valve 62 feeding a pump 64. The pump 64 is connected to a recycle pipe 66, a product pipe 68 and a waste pipe 70. The recycle pipe 66 has a recycle stream control valve 72 connected in series therewith. The product pipe 68 has a product stream control valve 74 connected between it and the product pipe 18. The waste pipe 70 has a waste stream control valve 76 connected between it and the waste pipe 20. The recycle stream control valve 72 is also connected to the feed header 52.

In order to clean the resin bed 47 periodically, a backwash water supply pipe 80 is provided which has a backwash stream control valve 82. The backwash supply pipe 80 communicates with the drain header 42. In order to allow the backwash water delivered by the drain header 42 to flow out of the separation vessel 12, a backwash-rinse distributor 84 is provided at the top thereof and has a header 86 connected thereto which is in communication with a backwash outlet pipe 88. The backwash outlet pipe 88 is in series connection with a backwash outlet stream control valve 90. The backwash-rinse distributor 84 performs an additional function in delivering rinse water to the anion exchange resin bed 47. Rinse water is received through a rinse water pipe 92 and comprises either condensate or deionized water. The rinse water pipe 92 communicates with a rinse water stream control valve 94 which is connected to the backwash-rinse header 86.

In the event that the anion exchange resin bed 47 becomes contaminated with foreign ions, such as phosphates or organic foulants such as bacteria, the contamination can be removed by regenerating the resin bed 47 with a sodium hydroxide or caustic solution. The sodium hydroxide regenerant solution is supplied through a caustic regenerant pipe 100 which is connected to a caustic regenerant stream control valve 102 communicating with the drain header 42. As will be seen in more detail hereinafter, in the event that caustic regeneration is necessary, the anion exchange resin in bed 47 would be converted to the hydroxyl ion form by the sodium hydroxide and thus it would be necessary to reconvert the anion exchange resin in bed 47 to the chloride ion form. The reconversion would be effected by flowing a stream of regenerant hydrochloric acid received from an acid regenerant pipe 100 and flowing through an acid regenerant stream control valve 112 into the feed header 52.

Turning now to the operation of the apparatus in the service cycle, which comprises the inventive process, it is assumed that the anion exchange resin bed 47 is already in the chloride form and is well backwashed to remove contaminants and to insure that the resin is saturated with deionized water. In the first or feed-product step, all of the valves remain closed with the exception of the feed stream control valve 50 which is open, the drain valve 62 which is open, and the waste stream control valve 76 which is open. The initial feed-product step is somewhat atypical of the usual service cycle since normally during the first step of the service cycle the waste stream control valve 76 is closed and the product stream control valve 74 is open. However, on startup, the spent mixture of hydrochloric acid and sodium chloride in aqueous solution flows into the feed pipe 16 through the open feed control valve 50 into the feed header 52 and the feed distributor 54 where it is delivered to the top of the anion exchange resin bed 47. Since the bed 47 is already saturated, as the feed stream flows in, the deionized water already in the bed 47 is allowed to flow out through the drain valve 62, the pump 64, the waste stream control 76 and the waste pipe 20. In the instant embodiment, approximately 0.20 of a bed volume of feed stream is delivered to the bed 47. Simultaneously, 0.20 of a bed volume is removed through the drain header 42 and discharged through the waste pipe 20. The effluent discharged from the waste pipe 20 is then disposed of.

As the feed stream flows onto the top of the anion exchange resin bed 47 and flows down through the bed 47, the hydrochloric acid is retarded near the top of the bed 47 while the sodium chloride in solution flows relatively quickly down the bed toward the drain distributor 40. Once the first 0.20 of the bed volume of feed or spent acid is supplied to the bed, both the feed stream control valve 50 and the waste stream control valve 76 are closed.

In a second, or low concentration recycle, step of the process, the recycle stream control valve 72 is opened and the pump 64 is actuated to draw off 0.05 of a bed volume of solution through the drain distributor 40 and resupply the effluent through the recycle loop 14 to the feed distributor 54 where it is loaded onto the top of the column. For the initial startup, such recycling is unimportant. However, once the service cycle is under way, the recycling becomes critical to the efficient operation of the process.

At this point in the process, the recycle stream control valve 72 is closed in preparation for the third or rinse-waste process step. The acid has separated from the salt, the salt being positioned in a layer primarily near the bottom of the resin bed 47, the acid being positioned in a layer near the upper portion of the resin bed 47 and an intermediate or interface layer of mixed acid and salt present therebetween. The rinse water valve 94 is then opened to admit 0.40 of a bed volume of rinse water to the separation vessel 12 through the backwashrinse distributor 84 while simultaneously draining 0.40 of a bed volume of solution, primarily containing sodium chloride, through the drain valve 62, the pump 64, the waste pipe 70, the waste stream control valve 76 and out of the system from the waste pipe 20. This step substantially removes the salt fraction from the anion exchange resin bed 47. At the end of this step, the rinse water supply valve 94 and the waste stream control valve 76 are closed. An interface layer of solution comprising relatively highly concentrated hydrochloric acid and sodium chloride is positioned adjacent the drain distributor 40. This layer is drawn off by pump 64 in the fourth, or high concentration recycle, step of the process, is pumped through recently opened recycle stream control valve 72 and delivered from the distributor head 54 to the top of the resin bed 47. Thus, the initial or startup cycle of the process has been completed and the apparatus 10 can be operated to perform the normal service cycle.

During the feed-product step, therefore, spent acid is admitted to the top of the anion exchange resin bed 47 from the feed pipe 16 through the distributor head 54. Simultaneously, relatively pure hydrochloric acid is drawn off through drain distributor 40, drain valve 62 and delivered by pump 64 through the open product stream control valve 74 to the product pipe 18. The relatively pure hydrochloric acid has only 15% of the salts originally found in the spent acid. In addition, approximately 85% of the spent acid is recovered. By decreasing acid yield, the residual salt concentration in the product stream could also be reduced. Thus, the first step in the cycle comprises a feed stream in-product stream out step.

In the second step of the cycle, the product stream control valve 74 is closed, the recycle stream control valve 72 is open and a relatively low concentration acid interface layer is pumped around through the recycle loop 14 to the distributor head 54 where it is delivered to the top of the bed 47. This allows the mixed or interface layer to be returned to the top of the bed for further separation and conserves hydrochloric acid.

The third step in the process comprises, as was stated above, admitting 0.40 of a bed volume through the backwash-rinse distributor head 84 to the anion exchange resin bed 47. The rinse water flowing into the bed 47 carries the separated acid and salt fractions down the bed and, since the waste pipe 20 is connected in communication with the drain valve 62, the incoming rinse water forces the salt fraction, located adjacent distributor 40, out the drain header 42 and the waste pipe 20. The rinse water also carries a relatively concentrated interface layer of acid and salt down toward the drain distributor 40 ahead of the acid fraction. The waste stream control valve 76 is then closed, as is the rinse water valve 94, and the recycle stream control valve 72 is opened so that the concentrated acid-salt interface layer is then recirculated through the recycle loop 14 to the top of the bed in the fourth, or high concentration recycle, step.

In each of the steps, the concentration gradient of acids and salts across the drain distributor 40 is zero due to the flat false bottom 28 of the separation tank 12.

In summary then, the process consists of four steps operated seriatim consisting of introducing a feed stream while withdrawing an acid product stream, recycling a relatively dilute acid-salt interface layer, introducing a rinse water stream while withdrawing a waste salt stream and finally, recycling a relatively concentrated acid-salt interface layer to the top of the bed.

One of the advantages of the instant process lies in the fact that as each feed pulse of acid is supplied to the anion exchange resin bed 47, a relatively low concentration of acid goes onto the bed 47 when its adsorption sites are relatively freely available. However, as the adsorption sites are occupied by the acid, the acid concentration increases, thereby promoting the efficiency of the separation.

In the event that the bed has been used over a number of cycles, it may be appreciated that it is unnecessary to regenerate it since the anion exchange resin is maintained in the common ion or chloride form with the hydrochloric acid and sodium chloride. Thus, the four step process may be repeated without having to regenerate the ion exchange bed, thereby increasing the efficiency of the acid separation process. Furthermore, provision has been made to backwash and reclassify the bed at relatively long intervals as part of the preventive maintenance of the system. In order to backwash the bed, all of the valves in the system are closed with the exception of the backwash inlet stream valve 82 and the backwash outlet stream valve 90. Backwash water is then flowed in through the pipe 80, out of the drain distributor 40 through the anion resin bed 47, and out the rinse distributor 84. The water is then exhausted through pipe 88 and backwash outlet control valve 90. In the event that the bed becomes contaminated as may sometimes happen, provision has been made to remove contaminants from the bed and regenerate it. It should be understood, though, that in the normal operation of the bed, such regeneration should prove unnecessary.

In order to remove the contaminants, which often comprise anion, such as phosphates and bacteria, all of the valves in the system are closed, with the exception of the caustic regenerant stream control valve 102 and the backwash outlet valve 90. A sodium hydroxide solution is flowed in through pipe 100 through drain header 42 and out the drain distributor 40 where it comes in contact with the anion exchange resin bed 47. The sodium hydroxide solution exchanges hydroxyl ions for chloride ions and other anions and contaminants on the resin and carries them out of the bed 47 through distributor 82. However, as was mentioned above, once the caustic regeneration cycle has been completed, the anion exchange resin is left in the hydroxyl rather than the common ion or chloride form.

Accordingly, it is then necessary to flow a regenerant hydrochloric acid stream received from pipe 110 through regenerant acid stream control valve 112 into header 52 and distributor 54. The regenerant stream removes the hydroxyl ions from the resin and substitutes chloride ions therefore, leaving the resin in chloride form.

It may be appreciated then that a new and economical process for the separation of acids from salts has been developed and is disclosed and claimed herein. Although in the preferred embodiment the disclosed process is directed to the separation of hydrochloric acid from sodium chloride, other mineral acids can be separated from their common ion metallic salts by the instant process. For instance, sulphuric acid can be separated from sulfate salts and phosphoric acid can be separated from phosphate salts.

While there has been shown and described a specified embodiment of the present invention, it will be apparent to those skilled in the art that various changes and modifications may be made without departing from the invention in its broadest aspects, and it is, therefore, contemplated in the appended claims to cover all such changes and modifications as fall within the true spirit and scope of the present invention.

What is claimed as new and desired to be secured by Letters Patent of the United States is:

1. A process for separating a mineral acid from metallic salt comprising the steps of: containing a strong base anion exchange resin in common ion form with a mixture containing a mineral acid and a metallic salt having a common ion, separating by adsorption on said strong base anion exchange resin said mineral acid from said salt into a salt layer, an interface layer and an acid layer, removing the separated salt layer from said stong base anion exchange resin, recycling said interface layer for further contact with said strong base anion exchange resin, and removing said acid layer from said strong base anion exchange resin.

2. A process for separating a mineral acid from a metallic salt as defined in claim 1 wherein said common ion is a chloride ion.

3. A process for separating a mineral acid from a metallic salt as defined in claim 1 wherein said mineral acid is hydrochloric acid.

4. A process for separating a mineral acid from a metallic salt as defined in claim 1 wherein said metallic salt is sodium chloride.

5. A process for separating a mineral acid from a metallic salt as defined in claim 1 wherein said common ion is a chloride ion, said mineral acid is hydrochloric acid and said metallic salt is sodium chloride.

6. A process for separating a mineral acid from a metallic salt as defined in claim 1 wherein said strong base anion exchange resin is arranged in a column and said mixture separates into said salt layer which moves down said column most rapidly and said interface layer which moves down said column less rapidly than said salt layer and said acid layer which moves down said column less rapidly than said salt layer and said interface layer.

7. A process for separating a mineral acid from a metallic salt as defined in claim 6 wherein said interface layer constitutes a high concentration interface layer.

8. A process for separating a mineral acid from a metallic salt as defined in claim 7 wherein said acid layer is removed from said strong base anion exchange resin by introducing a quantity of rinse water to said strong base anion exchange resin.

9. A process for separating a mineral acid from a metallic salt as defined in claim 8 wherein a low concentration interface layer is recycled from a bottom portion of said strong base anion exchange resin column to a top portion of said strong base anion exchange resin column following removal of said acid layer from said resin.

10. A process for separating hydrochloric acid from sodium chloride in aqueous solution comprising the steps of contacting a column of strong base chloride form anion exchange resin at a top portion with a feed mixture containing said hydrochloric acid and said sodium chloride in aqueous solution, allowing said mixture to flow down said strong base anion exchange resin column so that said feed mixture separates into a rapidly moving sodium chloride layer, a less rapidly moving high concentration interface layer having a mixture of sodium chloride and hydrochloric acid and a least rapidly moving hydrochloric acid layer, draining a solution containing said rapidly moving sodium chloride layer from a bottom portion of said strong base anion exchange resin column, while introducing deionized water to a top portion of said strong base anion exchange resin column, recycling said sodium chloride-hydrochloric acid high concentration interface layer to said top portion of said strong base anion exchange resin column for further contact and separation by said strong base anion exchange resin column, removing a solution containing said hydrochloric acid layer from said bottom of said strong base anion exchange resin column while introducing another quantity of feed mixture to said top portion of said strong base anion exchange resin column, and recycling a low concentration hydrochloric acid-sodium chloride interface layer to said top portion of said strong base anion exchange resin column for further contact and separation by said strong base anion exchange resin column.

* * * * *